United States Patent [19]

Barranco, Jr.

[11] Patent Number: 5,301,640
[45] Date of Patent: Apr. 12, 1994

[54] ENGINE VALVE

[76] Inventor: Joseph M. Barranco, Jr., 127 Wood Dale Dr., Ballston Lake, N.Y. 12019

[21] Appl. No.: 65,378

[22] Filed: May 24, 1993

[51] Int. Cl.$^5$ ................................................ F01L 3/06
[52] U.S. Cl. ........................ 123/188.03; 123/188.007; 251/126
[58] Field of Search ............ 123/188.3, 188.7, 188.14; 251/126, 333

[56] References Cited

U.S. PATENT DOCUMENTS

| 1,418,911 | 6/1922 | Garlick | 123/188.7 |
| 1,539,167 | 5/1925 | Diel et al. | 123/188.7 |
| 2,111,549 | 3/1938 | Blanchet | 123/188.7 |
| 2,988,080 | 6/1961 | Rankl | 123/188.7 |
| 4,137,886 | 2/1979 | Hiramatsu | 123/188.14 |
| 4,428,336 | 1/1984 | Dye et al. | 123/188.7 |
| 4,744,340 | 5/1988 | Kirby | 123/188.7 |
| 5,099,808 | 3/1992 | Matsuura et al. | 123/188.3 |

FOREIGN PATENT DOCUMENTS

| 0355649 | 8/1961 | Switzerland | 123/188.7 |
| 2041443 | 9/1980 | United Kingdom | 123/188.14 |

Primary Examiner—E. Rollins Cross
Assistant Examiner—Erick Solis
Attorney, Agent, or Firm—Leon Gilden

[57] ABSTRACT

An engine valve includes a valve head having a helical top wall arranged to enhance turbulence in an associated combustion chamber of an internal combustion engine to enhance mixing and effective efficiency during the combustion procedure.

6 Claims, 5 Drawing Sheets

ENGINE VALVE

BACKGROUND OF THE INVENTION

1. Field of the Invention

The field of the invention relates to engine valve apparatus, and more particularly pertains to a new and improved engine valve wherein the same is directed to the enhanced efficiency during the combustion process of an internal combustion engine.

2. Description of the Prior Art

Engine valves are employed typically in internal combustion engines such as indicated in U.S. Pat. Nos. 4,805,573 and 4,106,439.

The instant invention attempts to overcome deficiencies of the prior art by providing for enhanced engine combustion efficiency by providing for a swirling and distribution of combustion gases directed into the combustion chamber of an associated internal combustion engine and in this respect, the present invention substantially fulfills this need.

SUMMARY OF THE INVENTION

In view of the foregoing disadvantages inherent in the known types of engine valve structure now present in the prior art, the present invention provides an engine valve wherein the same employs a valve head having a helical swirling top wall. As such, the general purpose of the present invention, which will be described subsequently in greater detail, is to provide a new and improved engine valve which has all the advantages of the prior art engine valve structure and none of the disadvantages.

To attain this, the present invention provides an engine valve including a valve head having a helical top wall arranged to enhance turbulence in an associated combustion chamber to an internal combustion engine to enhance mixing and effective efficiency during the combustion procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved engine valve which has all the advantages of the prior art engine valve structure and none of the disadvantages.

It is another object of the present invention to provide a new and improved engine valve which may be easily and efficiently manufactured and marketed.

It is a further object of the present invention to provide a new and improved engine valve which is of a durable and reliable construction.

An even further object of the present invention is to provide a new and improved engine valve which is susceptible of a low cost of manufacture with regard to both materials and labor, and which accordingly is then susceptible of low prices of sale to the consuming public, thereby making such engine valves economically available to the buying public.

Still yet another object of the present invention is to provide a new and improved engine valve which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
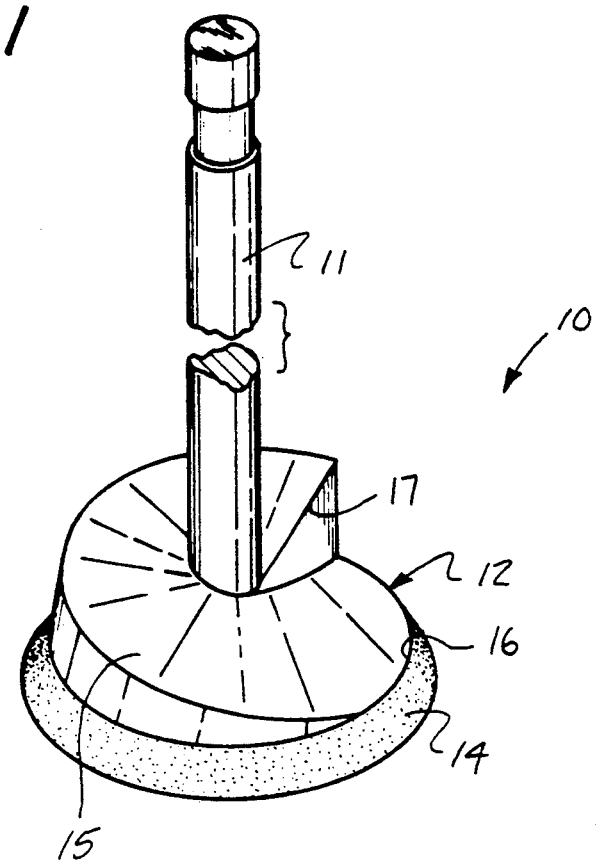
FIG. 1 is an isometric illustration of the invention.
Figure 2:
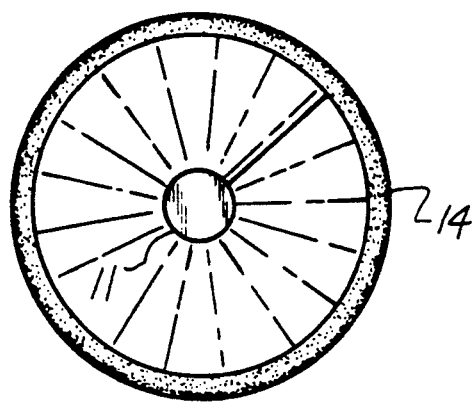
FIG. 2 is an orthographic top view of the invention.

With reference now to the drawings, and in particular to FIGS. 1 to 10 thereof, a new and improved engine valve embodying the principles and concepts of the present invention and generally designated by the reference numeral 10 will be described.

More specifically, the engine valve 10 of the instant invention essentially comprises a valve stem 11 fixedly and orthogonally mounted to a valve head 12. The valve head includes a valve head bottom wall 13 arranged in a facing relationship relative to a combustion chamber of an internal combustion engine, in a manner as indicated in U.S. Pat. No. 4,805,573 incorporated herein by reference. The valve head 12 includes a valve head top wall 15 having a helical configuration, including a top wall first end 16 arranged in contiguous communication with a conical side wall portion 14 of the valve head 12. The top wall includes a top wall second end 17 radially directed to the valve stem 11 arranged in a spaced relationship to the valve head 12. The top wall structure in this manner provides for enhanced swirling of combustion charges directed into and out of the associated internal combustion engine. Particularly, intake charges are swirled in the upper projection of the internal combustion chamber for enhanced combustion efficiency.

Figure 3:
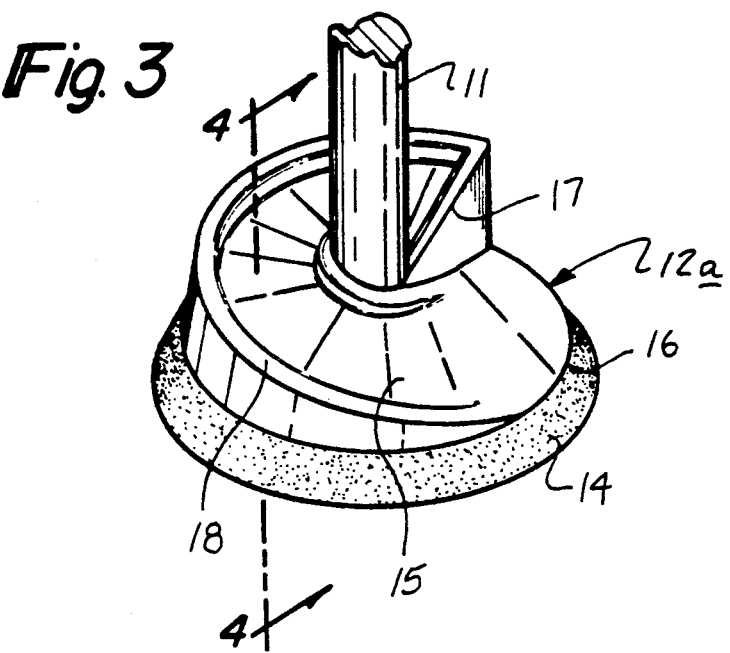
FIG. 3 is an isometric illustration of a modified head structure of the invention.
Figure 4:
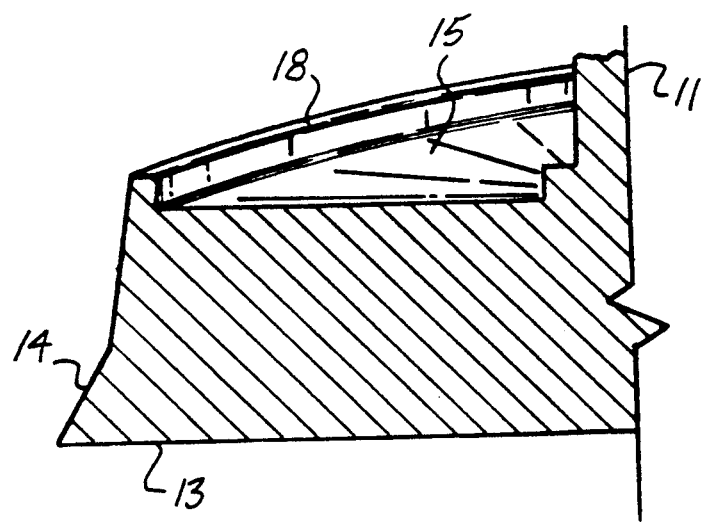
FIG. 4 is an orthographic view, taken along the lines 4—4 of FIG. 3 in the direction indicated by the arrows.

The FIG. 3 indicates the top wall 15 including a peripheral top wall outer rib 18 extending from the conical side wall portion 14 with the top wall first end 16 to the top wall second end 17, with the rib 18 arranged concentrically relative to the stem 11.

Figure 5:
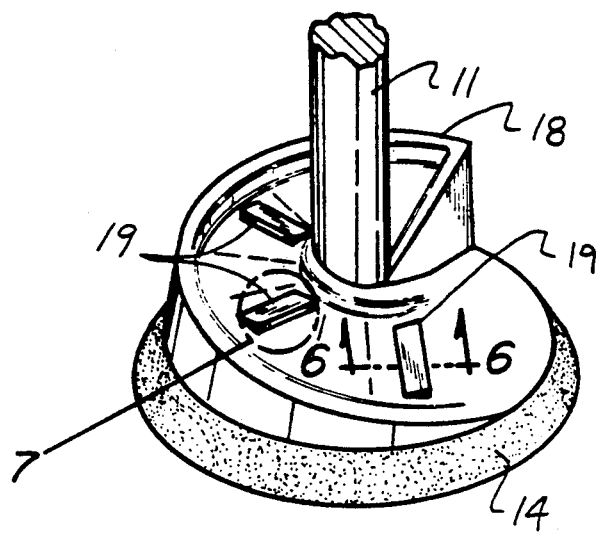
FIG. 5 is a further modified aspect of the head structure of the invention.
Figure 6:
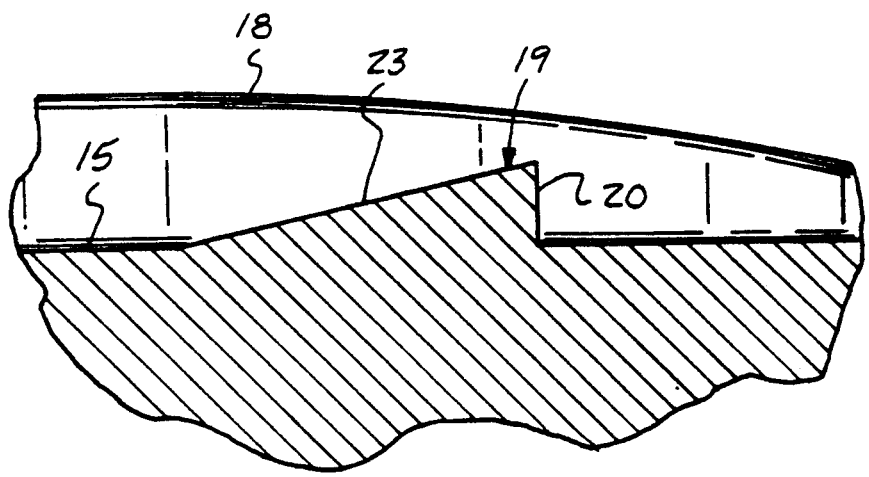
FIG. 6 is an orthographic view, taken along the lines 6—6 of FIG. 5 in the direction indicated by the arrows.
Figure 8:
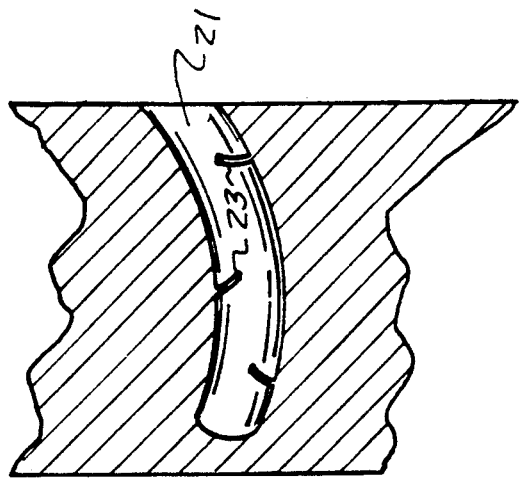
FIG. 8 is an orthographic view, taken along the lines 8—8 of FIG. 7 in the direction indicated by the arrows.
Figure 7:
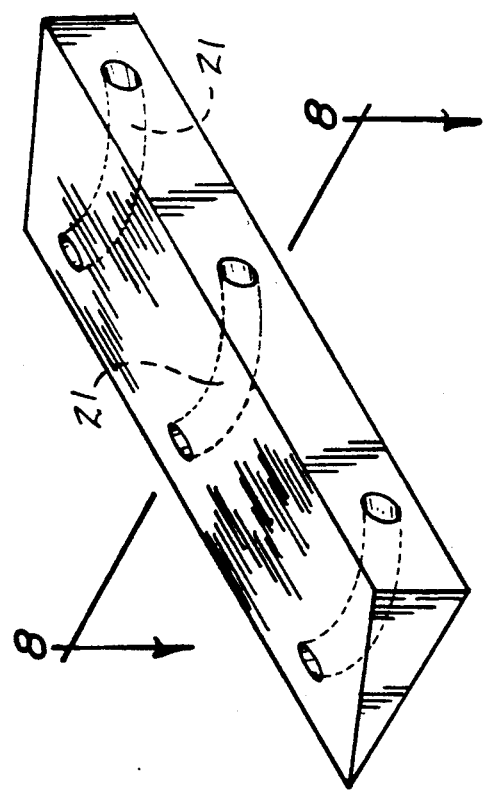
FIG. 7 is an enlarged isometric illustration of a ramp structure as employed by the invention, as indicated in FIG. 5.

The FIGS. 5 and 6 indicates the additional employment of ramp plates 19 integrally mounted to the top wall 15 extending above the top wall. Each of the ramps 19 include a ramp front wall 20 orthogonally oriented relative to the top wall 15, and a ramp plate top wall canted from the ramp wall 20 to the valve head top wall 15. The ramps 19 are radially directed along the top wall 15 to and in a spaced relationship relative the stem 11 to provide for enhanced swirling and agitation of a charge of fuel directed along the top wall. Further to enhance such swirling or even greater efficiency if desired, each of the ramps are arranged to optionally employ a front wall conduit 21 directed from the front wall 20 projecting through the ramp top wall 23, with each of the conduits arranged to include a plurality of conduit baffle flanges 22 therewithin.

Figure 9:
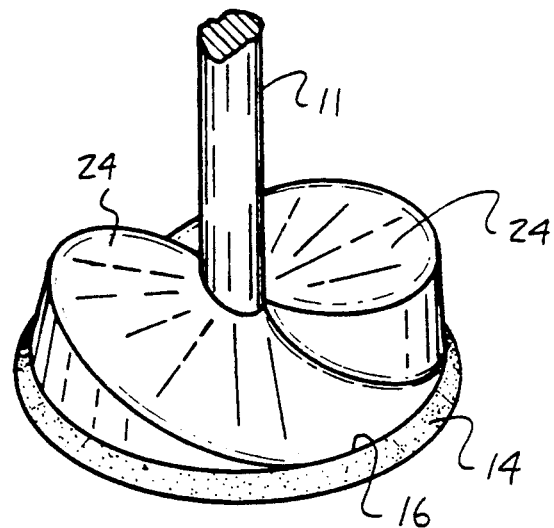
FIG. 9 is an isometric illustration of a modified head structure of the invention employing a plurality of ramps.
Figure 10:
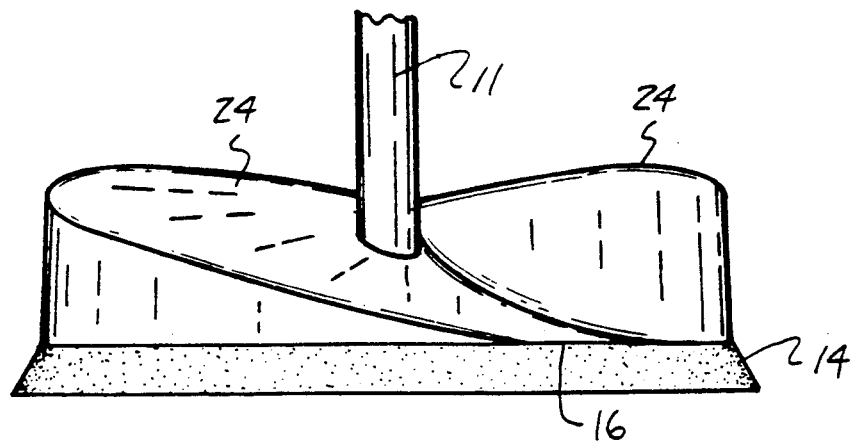
FIG. 10 is an orthographic side view of the modified valve structure as indicated in FIG. 9.

The FIGS. 9 and 10 provide for an optional structure of the valve head top wall to include opposed helical ramp top walls 24, each including a top wall first end 16 at opposed sides of the stem 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An engine valve, comprising,
a valve stem, the valve stem including a valve head fixedly and orthogonally mounted to the valve stem, the valve head including a valve head bottom wall and a valve head helical top wall, the top wall arranged concentrically about the valve stem, with the valve head further including a conical side wall portion, with the top wall including a top wall first end in contiguous communication with the conical side wall portion, and a top wall second end radially directed and in intersection with the valve stem, with the top wall second end arranged in a spaced relationship relative to the conical side wall portion.

2. An engine valve as set forth in claim 1 wherein the top wall includes an outer rib, with the outer rib integrally mounted coextensive with the top wall peripherally thereof extending from the top wall first end to the top wall second end.

3. An engine valve as set forth in claim 2 including at least one ramp member mounted to the top wall, wherein the ramp member includes a ramp member front wall and a ramp member top wall, wherein the ramp member is radially aligned relative to the valve stem and spaced therefrom.

4. An engine valve as set forth in claim 3 wherein said ramp member front wall is orthogonally oriented relative to the helical top wall and intersects the helical top wall, and the ramp member top wall is canted from the ramp member front wall to the helical top wall of said valve head.

5. An engine valve as set forth in claim 4 wherein said ramp member includes at least one conduit directed therethrough extending from the ramp member front wall to the ramp member top wall.

6. An engine valve as set forth in claim 5 wherein the conduit includes a plurality of baffle flanges positioned therewithin.

* * * * *